United States Patent
Yasui

(10) Patent No.: US 10,867,203 B2
(45) Date of Patent: Dec. 15, 2020

(54) APPARATUS FOR CONTROLLING IMAGING OF CAMERA AND SYSTEM PROVIDED WITH THE APPARATUS

(71) Applicant: DENSO WAVE INCORPORATED, Aichi-pref. (JP)

(72) Inventor: Kunio Yasui, Chiryu (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 101 days.

(21) Appl. No.: 14/657,507

(22) Filed: Mar. 13, 2015

(65) Prior Publication Data

US 2015/0262025 A1 Sep. 17, 2015

(30) Foreign Application Priority Data

Mar. 14, 2014 (JP) .................. 2014-052098

(51) Int. Cl.
| | |
|---|---|
| *H04N 7/18* | (2006.01) |
| *G06K 9/32* | (2006.01) |
| *G06K 9/00* | (2006.01) |
| *G06K 9/20* | (2006.01) |

(52) U.S. Cl.
CPC ....... *G06K 9/3258* (2013.01); *G06K 9/00771* (2013.01); *G06K 9/209* (2013.01); *H04N 7/181* (2013.01); *G06K 2209/15* (2013.01)

(58) Field of Classification Search
CPC .................................................. G06K 9/3258
See application file for complete search history.

(56) References Cited

U.S. PATENT DOCUMENTS

| | | | |
|---|---|---|---|
| 5,206,732 A | 4/1993 | Hudson | |
| 5,877,969 A * | 3/1999 | Gerber | .................. B60R 13/10 |
| | | | 116/33 |

(Continued)

FOREIGN PATENT DOCUMENTS

| | | |
|---|---|---|
| CN | 103279996 A | 9/2013 |
| JP | 2006302167 A * | 11/2006 |
| JP | 4038232 B1 | 1/2008 |

OTHER PUBLICATIONS

Jul. 16, 2015 Extended Search Report issued in European Application No. 15158917.3.

(Continued)

*Primary Examiner* — Jonathan R Messmore
(74) *Attorney, Agent, or Firm* — Oliff PLC

(57) ABSTRACT

In a camera control apparatus, an imaging control unit controls imaging operations of a camera. This camera is able to capture an image of a license plate of a vehicle entering a premises from an entrance thereof. A detection area setting unit sets a planar detection area for detecting a position of the vehicle. A vehicle detecting unit detects the position of the vehicle based on the detection area. The camera is capable of changing the imaging direction thereof. The detection area setting unit sets detection area groups, each of which are composed of a plurality of detection areas aligned in a width direction of the entrance, in multiple stages from the entrance towards the inside of the premises. The imaging control unit performs imaging while changing the imaging direction of the camera based on the position of the vehicle detected by the vehicle detecting unit.

17 Claims, 9 Drawing Sheets

(56) References Cited

U.S. PATENT DOCUMENTS

| | | | |
|---|---|---|---|
| 2006/0197839 A1* | 9/2006 | Senior | H04N 5/232 348/169 |
| 2009/0303356 A1 | 12/2009 | Min et al. | |
| 2011/0310219 A1* | 12/2011 | Kim | G08B 13/19643 348/36 |
| 2014/0153020 A1* | 6/2014 | Tachikawa | H04N 1/00336 358/1.13 |
| 2014/0334668 A1* | 11/2014 | Saund | G06T 7/20 382/103 |

OTHER PUBLICATIONS

Jul. 7, 2015 Search Report in Singapore Patent Application No. 102015019721U.

Jul. 7, 2015 Written Opinion in Singapore Patent Application 10201501972U.

* cited by examiner

APPARATUS FOR CONTROLLING IMAGING OF CAMERA AND SYSTEM PROVIDED WITH THE APPARATUS

CROSS-REFERENCE TO RELATED APPLICATION

This application is based on and claims the benefit of priority from earlier Japanese Patent Application No. 2014-052098 filed Mar. 14, 2014 the description of which are incorporated herein by reference.

BACKGROUND OF THE INVENTION

Field of the Invention

The present invention relates to an apparatus for controlling imaging of an optical camera and a system provided with the apparatus, and in particular to the apparatus and system that trace a vehicle and captures the license plate of an optical image of the camera that is entering a premises (or site, lot) from an entrance thereof.

Description of the Related Art

Conventionally, a system is known in which, when a customer visits a store by vehicle (vehicle), customer information is acquired on the premises (such as a parking lot) on which the customer parks the vehicle. For example, as described in Japanese Patent Publication No. 4038232, a system that identifies a customer based on the vehicle number (or car number) written on the license plate of the car (or vehicle) of the customer is known. In a system such as this, a camera captures an image of the license plate of an vehicle that is entering a premises from an entrance, and the vehicle number is recognized from the captured image (refer to, for example, Japanese Patent Publication No. 4038232).

However, in the above-described conventional technology, when the lateral width of the entrance is relatively wide, a captured image that has the resolution (number of pixels) required for vehicle number recognition may not be acquired when imaging of the overall entrance is attempted by a single camera. In response to such issues, a method in which a plurality of cameras perform imaging of the overall entrance or a method in which a single pan-tilt-zoom (PTZ) camera is used to move the imaging direction so as to track a moving vehicle can be considered.

However, in the former method, a plurality of dedicated cameras for capturing an image of the license plate is required to be provided, causing a problem in that system cost increases as a result. In addition, in the latter method, when the speed of the vehicle that is entering the premises is high, PTZ control may not be able to keep up with the movement and the likelihood of failure in capturing an image of the license plate increases.

SUMMARY

Hence, it is desired to provide a camera control apparatus that is capable of acquiring a captured image that has the resolution required for vehicle number recognition and reducing the imaging failure, while capturing an image of a license plate of a vehicle by a single camera.

A camera control apparatus according to an exemplary example includes: an imaging control unit that controls operation of a camera that captures an image of a license plate of a vehicle that is entering a premises from an entrance; a detection area setting unit that sets a planar detection area for detecting a position of the vehicle; a vehicle detecting unit that detects the position of the vehicle based on the detection area set by the detection area setting unit. The camera is configured to be capable of changing the imaging direction thereof. The detection area setting unit sets detection area groups, each of which are composed of a plurality of detection areas aligned in a width direction of the entrance, in multiple stages from the entrance towards the inside of the premises. The imaging control unit performs imaging while changing the imaging direction of the camera based on the position of the vehicle detected by the vehicle detecting unit.

In other words, when the vehicle is detected in a detection area of a first-stage detection area group that is closest to the entrance among the detection area groups, the imaging control unit performs a positioning operation such as the following. In the positioning operation, first, the imaging control unit changes the imaging direction of the camera towards the position (detection area) in which the vehicle is detected in the first-stage detection area group. Then, when the vehicle is detected in the next-stage detection area group, the imaging control unit changes the imaging direction of the camera towards the position in which the vehicle is detected in the next-stage detection area group. The positioning operation such as this is successively performed until the vehicle is detected in the final-stage detection area group that is farthest from the entrance. Then, when the vehicle is detected in the final-stage detection area group, the imaging control unit determines the detection area in which the vehicle is detected in the final-stage detection area group as the final imaging direction of the camera, and performs imaging of the vehicle.

In this way, the imaging control unit starts the positioning operation of the camera when the vehicle detecting unit detects the entrance of the vehicle onto the premises, and successively changes the imaging direction of the camera to match (track) the changes in position of the vehicle detected by the vehicle detecting unit, before performing imaging of the vehicle. In this case, the first-stage detection area group that is closest to the entrance among the detection area groups is composed of two or more detection areas, and the subsequent-stage detection area groups are composed of a larger number of detection areas than the number of detection areas in the preceding-stage detection area group. In other words, the detection areas in the detection area groups that are set in multiple stages increase in number from the entrance towards the inside of the premises, and the width-direction dimension of a single detection area becomes smaller (the resolution for vehicle position detection increases). Therefore, in the above-described positioning operation of the camera, the amount of change (amount of movement) in the imaging direction of the camera becomes smaller as the vehicle moves from the entrance towards the inside of the premises, or in other words, as the timing at which imaging of the vehicle is performed approaches. Therefore, the movement of the vehicle that is entering the premises can be tracked and imaging can be performed at an appropriate imaging direction even when the speed of change in the imaging direction (movement speed) of the camera is relatively slow, the speed of the vehicle is relatively high, and the like.

In addition, in this case, the overall area of the entrance is not required to be included as the imaging area of the camera. The imaging area may merely be such that a single detection area in the final-stage detection area group is included. Therefore, the resolution of the captured image does not significantly decrease. Thus, in the present means, even in the case of a store such as a car dealership in which the width of the entrance is relatively wide, a captured image that has the resolution required for vehicle number recognition can be acquired and the imaging failure can be reduced, while capturing an image of the license plate of the vehicle that is entering the premises from the entrance by a single camera.

DETAILED DESCRIPTION OF THE PREFERRED EMBODIMENTS

A plurality of embodiments of the present invention will hereinafter be described with reference to the drawings. Configurations in the embodiments that are the same or essentially the same are given the same reference numbers. Redundant of descriptions thereof are omitted or simplified.

First Embodiment

A first embodiment of the present invention will hereinafter be described with reference to FIG. 1 to FIG. 5.

Figure 1:
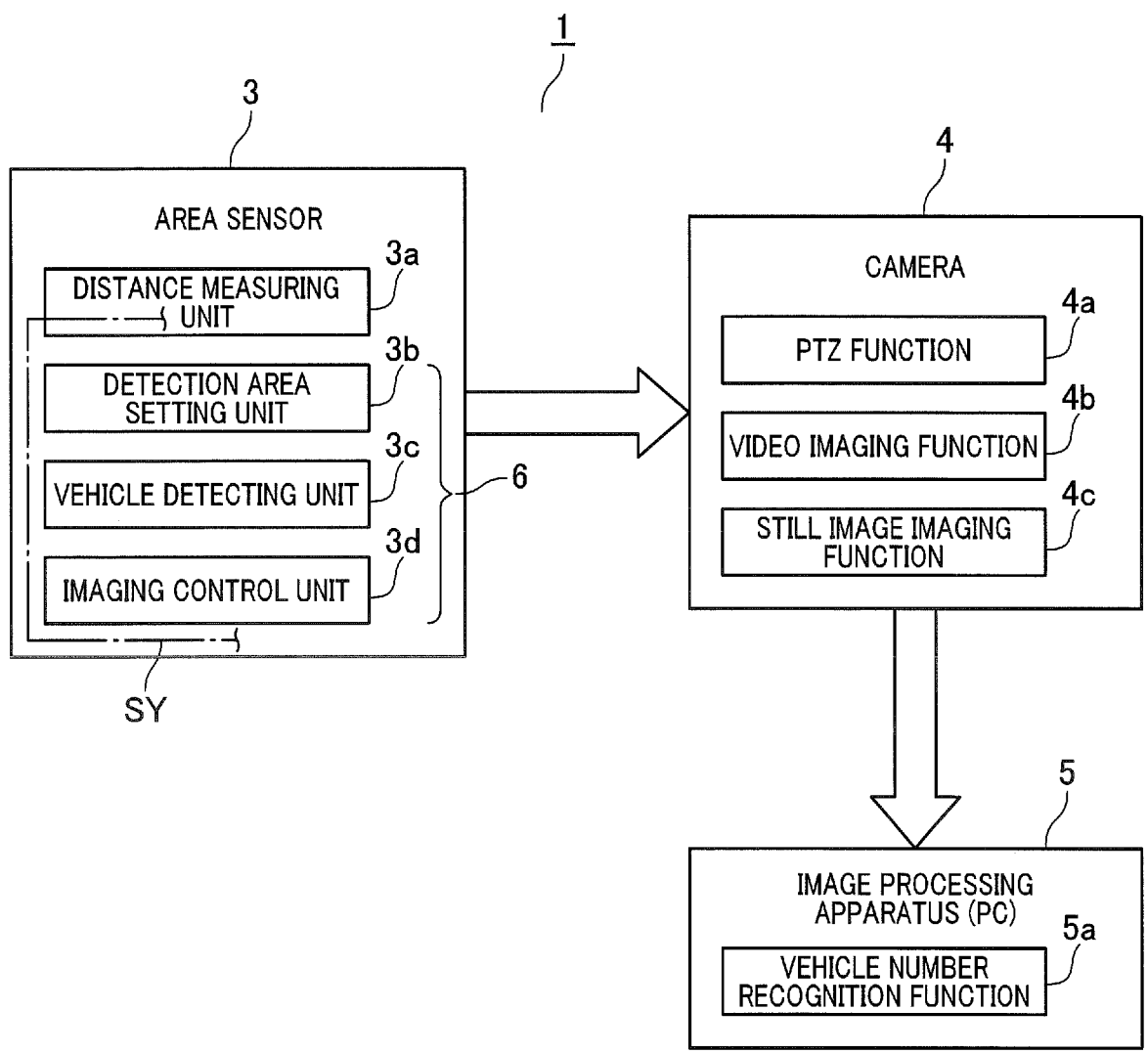
FIG. 1 is a diagram of a first embodiment, showing each function configuring a vehicle number recognition system.

A vehicle number recognition system 1 shown in FIG. 1 is used in a store, such as a car dealership, and recognizes the vehicle number on the license plate of a vehicle (or car, which is indicated by reference number 2 in FIG. 2) of a customer who is visiting the store. When a data base that stores customer information is referenced based on the vehicle number (or car number) that has been recognized by the vehicle number recognition system 1 such as this, information on the visiting customer (customer information) can be checked, thereby enabling various types of appropriate service to be promptly provided without keeping the visiting customer waiting.

The vehicle number recognition system 1 includes an area sensor 3, an optical camera 4 such as a visible light camera or an infrared camera, and an image processing apparatus 5. The area sensor 3 includes a distance measuring unit 3a, which is, for example, a laser radar apparatus that intermittently radiates a laser beam while rotating in a detection direction (, which is a laser-beam scan along a scanning plane in the horizontal direction, in this case) and receives reflection light of the laser beam. The distance measuring unit 3a of the area sensor 3 measures the distance to an object that has reflected the laser beam based on the amount of time from radiation of the laser beam to reception of the reflection light.

The area sensor 3 includes, in addition to the distance measuring unit 3a that measures the distance to the object as described above, a detection area setting unit 3b that sets a detection area, a vehicle detecting unit 3c that detects the position of the vehicle 2, and an imaging control unit 3d that controls imaging operations of the camera 4 for imaging, including the orientation of the angle of view and the imaging timing. In the present embodiment, the units 3b-3d are functionally realized by operations of a computer system SY provided with a not-shown CPU (central processing unit) and various types of memories (not shown) such as RAM (random access memory) and ROM (read only memory). Since predetermined types of software programs (applications) are previously stored in the ROM, the CPU reads such programs from the ROM and performs processing instructed by the programs in cooperation with the RAM, whereby the units 3b-3d are functionally realized. Of course, since the distance measuring unit 3a is equipped with a calculation and control part, this part is also functionally realized by operations of the computer system SY. According to the present embodiment, a camera control apparatus 6 is composed of the detection area setting unit 3b, the vehicle detecting unit 3c, and the imaging control unit 3d. The functions provided by the camera control apparatus 6 are not necessarily required to be provided by the area sensor 3, and may be actualized using an external apparatus separate from the area sensor 3.

Figure 2:
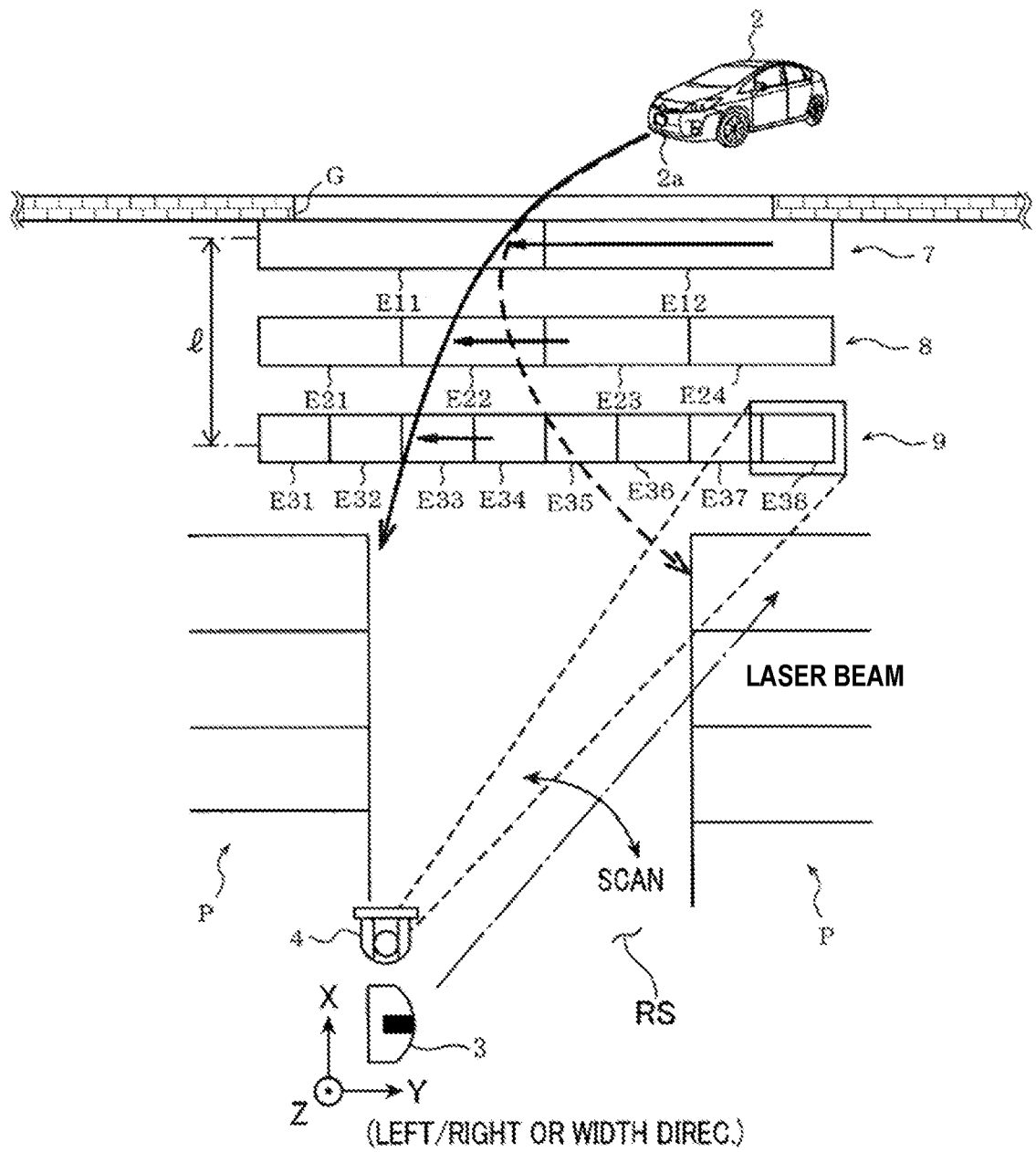
FIG. 2 is a schematic configuration diagram of the vehicle number recognition system.

The detection area setting unit 3b virtually sets, as data memorized by a memory, a detection area for detecting the position of the vehicle 2 (corresponding to a vehicle) that is entering the premises (or site, lot) from an entrance G. The detection area is defined by an XYZ coordinate system virtually set on a plane that is in the horizontal direction (horizontal plane) that is the detection direction of the area sensor 3. Specifically, as shown in FIG. 2, the detection area setting unit 3b virtually sets detection area groups 7 to 9 in multiple stages (three stages according to the present embodiment) from the entrance G towards the inside of the premises in the real space RS. In each detection area group 7 to 9, a plurality of rectangular-shaped detection areas are aligned in the width direction of the entrance G (left/right direction in FIG. 2). The three detection area groups 7 to 9 are each set so as to cover the overall area of the entrance G in the width direction. Positional information indicative of both the XYZ coordinate system and the detection area groups 7 to 9 in the XYZ coordinate system are stored in the not-shown ROM of the computer system SY in advance. The origin of the XYZ coordinate system may be set at an appropriate reference position in the real space RS. The positional information for the detection area groups 7 to 9 may also be angles and distances from the origin to each detection area in the XYZ coordinate system.

The detection area group 7 that is in the first stage (corresponding to a first-stage detection area group) is configured so that two detection areas E11 and E12 are aligned in the width direction of the entrance G. The first-stage detection area group 7 is provided in a position close to the entrance G so that the entrance of the vehicle 2 onto the premises is promptly detected. The second-stage detection area group 8 is configured so that four detection areas E21 to E24 are aligned in the width direction of the entrance G. Each detection area E21 to E24 is half the width of the first-stage detection area E11 or E12 (the width-direction dimension is half).

The third-stage detection area group 9 (corresponding to the final stage detection area group) is configured so that eight detection areas E31 to E38 are aligned in the width direction of the entrance G. Each detection area E31 to E38 is half the width of the second-stage detection area E21 to E24 (the width-direction dimension is half). As described hereafter, the third-stage detection area group 9 is the imaging direction for the vehicle 2. The imaging direction is set to be a directional position with a specified angle of view. When the imaging direction for the vehicle 2 is inside a parking space P, there is a likelihood that an image of the license plate 2a may not captured due to the effects of a turning operation and the like made to park the vehicle 2. Therefore, the third-stage detection area group 9 is provided in a position before (towards the entrance G) the parking space P.

In this way, the first-stage detection area group 7 closest to the entrance G among the detection area groups 7 to 9 is composed of the two detection areas E11 and E12. The subsequent-stage detection area groups 8 and 9 are respectively composed of a larger number of detection areas (four and eight) than the number of detection areas (two and four) in the detection area group in the preceding stage.

The vehicle detecting unit 3c detects the position of the vehicle 2 based on the distance measurement data provided by the distance measuring unit 3a and the detection areas E11 to E38 set by the detection area setting unit 3b. Specifically, the vehicle detecting unit 3c compares the position in the horizontal direction (coordinates on the horizontal plane) of the vehicle 2 acquired from the distance measurement data with the coordinates of all detection areas E11 to E38, thereby detecting the detection area, among the plurality of detection areas E11 to E38, in which the vehicle 2 that is entering the premises from the entrance G is present. The imaging control unit 3d performs imaging while changing the imaging direction of the camera 4 based on the position of the vehicle 2 detected by the vehicle detecting unit 3c (described in detail hereafter).

The camera 4 is a PTZ (pan, tilt and zoom) camera controlled by a PTZ control technique and includes a PTZ function 4a that performs panning, tilting, and zooming, a video imaging function 4b that captures a video, and a still image imaging function 4c that captures a still image. The functions 4a to 4c of the camera 4 are performed based on commands provided by the imaging control unit 3d of the area sensor 3. The camera 4 captures an optical image of the vehicle 2 that is entering the premises from the entrance G as a still image and outputs the captured image data to the image processing apparatus 5.

The image processing apparatus 5 is configured by a personal computer (PC) or the like. The image processing apparatus 5 includes a vehicle number recognition function 5a that extracts an image of the license plate 2a portion of the vehicle 2 from the captured image data outputted from the camera 4 and recognizes the vehicle number from the cut-out image. The vehicle number recognition function 5a is actualized by, for example, a predetermined application installed in the PC being run.

The area sensor 3 and the camera 4 are attached to a wall surface of the store, a dedicated pole, or the like. The installation height of the area sensor 3 is, for example, about 60 to 80 cm from the ground surface. A reason for this is to prevent a situation in which the laser beam is irradiated onto the window surface of the vehicle 2, thereby making distance measurement not possible. In addition, the installation height of the camera 4 is higher than the installation height of the area sensor 3 and is, for example, about 2 to 3 m from the ground surface.

In the above-described configuration, the imaging control unit 3d performs a positioning operation as follows. When a vehicle 2 is detected in the first-stage detection area group 7 (step S1), the imaging control unit 3d controls the camera such that the imaging direction of the camera 4 is moved towards the position in which the vehicle 2 is detected, or in other words, the detection area E11 or E12 (movement in the left/right direction=pan) (step S2). At this time, the target (i.e., target direction) of the imaging direction is near the center of the detection area E11 or E12 in the left/right direction.

Then, when the vehicle 2 is detected in the second-stage detection area group 8 (step S3), the imaging control unit 3d controls the camera 4 such that the imaging direction of the camera 4 is moved towards the position in which the vehicle 2 is detected, or in other words, any of the detection areas E21 to E24 (step S4). At this time as well, in a manner similar to that in the first stage, the target of the imaging direction is near the center of any of the detection areas E21 to E24 in the left/right direction.

Then, when the vehicle 2 is detected in the third-stage detection area group 9 (step S5), the imaging control unit 9 controls the camera 4 such that the imaging direction of the camera 4 is moved towards the position in which the vehicle 2 is detected, or in other words, any of the detection areas E31 to E38 (step S6). At this time as well, in a manner similar to that in the first and second stages, the target of the imaging direction is near the center of any of the detection areas E31 to E38 in the left/right direction. When the positioning operation is completed as described above, the imaging control unit 3d performs imaging of a still image with any of the third-stage detection areas E31 to E38 as the final imaging direction (with a specified angle of view) of the camera 4 (step S7). Data of the still image are then outputted to the image processing apparatus 5 for the vehicle number recognition (step S8).

In the forgoing steps S1 to S8, step S1 functionally realizes first determining means, step S2 functionally realizes first changing means, steps S3 and S5 functionally realize second determining means and repeating means, steps S4 and S6 functionally realize second changing means, step S7 functionally realizes imaging means, and step S8 functionally realizes outputting means.

When the vehicle detecting unit 3c detects the entrance of the vehicle 2 onto the premises, the imaging control unit 3d immediately starts the positioning operation of the camera 4 in this way. In other words, the imaging control unit 3d is configured to successively change the imaging direction of the camera 4 so as to track the changes in the position of the vehicle 2 detected by the vehicle detecting unit 3c, before performing imaging of the vehicle 2. Therefore, as a result of the detection area of the vehicle 2 being optimized by the vehicle detecting unit 3c as described below, the movement of the vehicle 2 that is entering the premises can be tracked and imaging can be performed at the appropriate imaging direction, regardless of the speed of the vehicle 2.

In other words, a distance I between the first-stage detection area group 7 and the third-stage detection area group 9 is set based on expression (1), below. Here, the maximum amount of time required to change the imaging direction of the camera (pan operation) is represented by tc, and the estimated maximum movement speed of the vehicle 2 is represented by va.

$$I = tc \times va \tag{1}$$

The maximum amount of time tc may be set, for example, to the amount of time required to move the imaging direction from one end to the other of the detection area groups 7 to 9, if the camera 4 is dedicated to the vehicle number recognition system 1 and is ordinarily facing the area near the entrance G. In addition, the maximum amount of time tc may be set, for example, to the amount of time required to move the imaging direction from a state facing the location farthest from the entrance G to the detection area groups 7 to 9, if the camera 4 is also used to capture images of other locations on the premises (such as to monitor the premises), in addition to being used by the vehicle number recognition system 1.

Next, a specific example of the positioning operation and the imaging operation in the above-described configuration will be described.

Figure 3A:
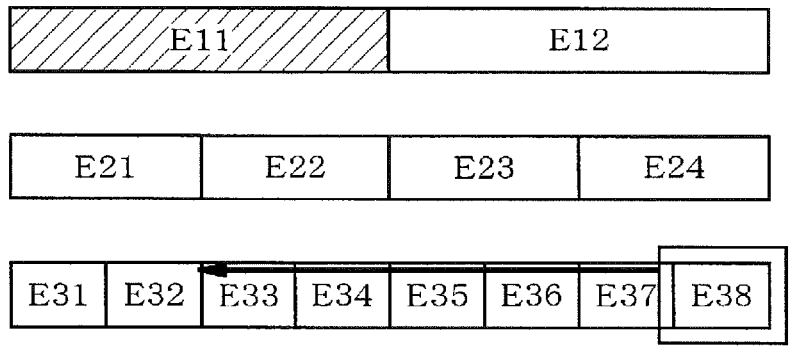
FIG. 3A to FIG. 3C are diagrams for explaining detailed examples of a positioning operation and an imaging operation.
Figure 3B:
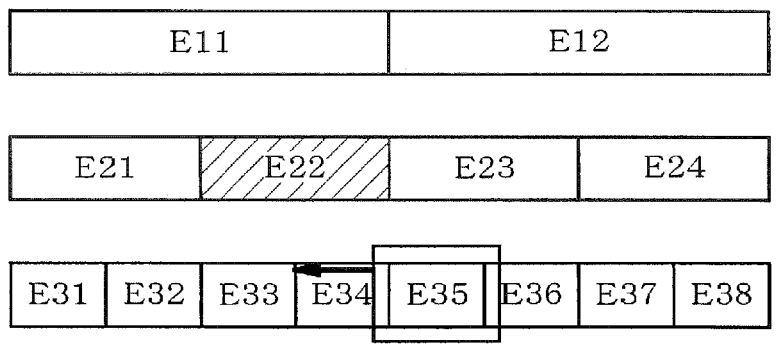

In this case, as shown in FIG. 3A, before the vehicle detecting unit 3c detects the entrance of the vehicle 2 onto the premises, the imaging direction of the camera 4 is a position in which the detection area E38 is included. Then, when the vehicle 2 is detected in the first-stage detection area E11, a pan operation of the camera 4 is performed so that the imaging direction (with an angle of view) moves towards the center of the detection area E11 (see FIG. 3A). Next, when the vehicle 2 is detected in the second-stage detection area E22, the pan operation of the camera 4 is performed so that the imaging direction moves towards the center of the detection area E22 (see FIG. 3B).

Then, when the vehicle 2 is detected in the third-stage detection area E33, the pan operation of the camera 4 is performed so that the imaging direction moves towards the center of the detection area E33. In this case, as a result of the positioning operations performed at the first and second stages, the imaging direction has already moved substantially near the detection area E33. Therefore, the detection area E33 becomes the imaging direction of the camera 4 as a result of the pan operation of the camera 4 being performed (see FIG. 3C).

Figure 3C:
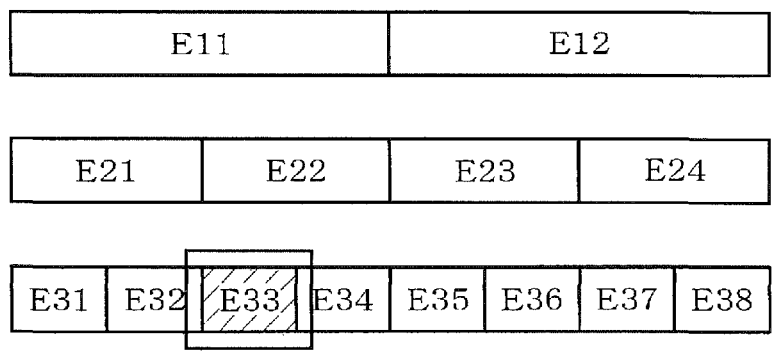
Figure 4:
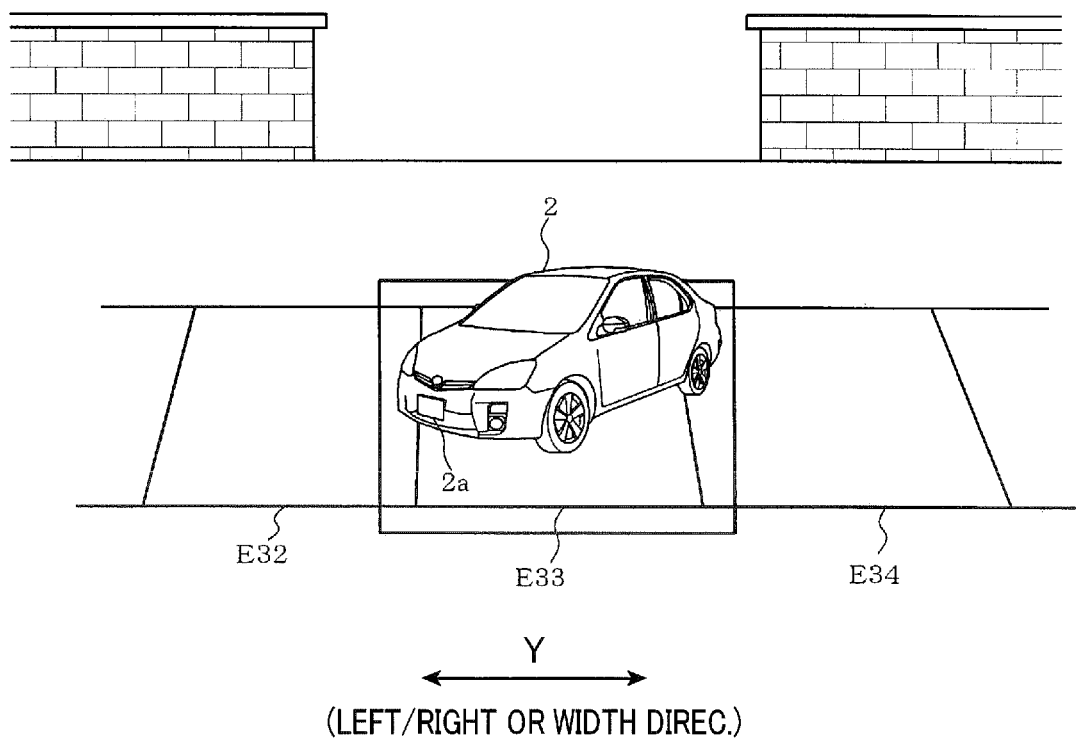
FIG. 4 is a diagram of a relationship between a final-stage detection area and an angle of view of a camera.

Then, in the state in FIG. 3C, the camera 4 performs imaging of a still image. At this time, as shown in FIG. 4, imaging of the vehicle 2 is performed at an angle of view that provides a predetermined angle margin to the detection area E33. As the above-described angle margin, a length that is at least about half the lateral width of the license plate 2a of the vehicle 2 in the horizontal direction may be set. Adjustment of the angle of view such as this can be performed by setting the installation position of the camera 4, setting zoom magnification, and the like.

As described above, the area sensor 3 according to the present embodiment includes the distance measuring unit 3a that measures the distance to an object, the detection area setting unit 3b that sets the detection area groups 7 to 9 (detection areas E11 to E38) in three stages from the entrance G towards the inside of the premises, the vehicle detecting unit 3c that compares the distance measurement data and the detection areas E11 to E38 and thereby detects the position of the vehicle 2, and the imaging control unit 3d that controls the operation of the camera 4 based on the position of the vehicle 2 detected by the vehicle detecting unit 3c.

Then, when the vehicle detecting unit 3c detects the entrance of the vehicle 2 onto the premises, the imaging control unit 3d starts the positioning operation of the camera 4. The imaging control unit 3d successively changes the imaging direction of the camera 4 so as to track the changes in detection position of the vehicle 2 from the point before imaging of the vehicle 2 is started. When the vehicle 2 is detected in the final-stage detection area group 9, the imaging control unit 3d determines the position in which the vehicle 2 is detected as the final imaging direction and performs imaging of a still image by the camera 4. In a configuration such as this, the movement of the vehicle 2 that is entering the premises can be tracked and imaging can be performed at an appropriate imaging direction, even when the speed of the vehicle 2 is relatively high.

In addition, it is difficult to estimate, with certainty, behavior such as whether the vehicle 2 that has entered from the entrance G will travel on the trajectory indicated by the solid-line arrow in FIG. 2 and move towards a parking space P on the left side or travel on the trajectory indicated by the broken-line arrow and move towards a parking space P on the right side. However, in the configuration according to the present embodiment, because the imaging direction of the camera 4 is moved so as to track the movement of the vehicle 2 that has entered the premises as described above, imaging can be performed at an appropriate imaging direction.

In addition, in this case, the overall area of the entrance G is not required to be included as the imaging area of the camera 4. The imaging area may merely be such that a single detection area (any of E31 to E38) in the final-stage detection area group 9 is included. As shown in FIG. 2, the length in the width direction of each detection area E31 to E38 is about one-eighths of the length in the width direction of the entrance G. Therefore, the resolution of the image captured by the camera 4 does not significantly decrease. In this way, according to the present embodiment, even when the store is a car dealership or the like in which the width of the entrance G is relatively wide, a captured image that has the resolution required for vehicle number recognition can be acquired and the imaging failure can be reduced, while capturing an image of the license plate 2a of the vehicle 2 that is entering the premises from the entrance G, by a single camera 4.

In general, the laser radar apparatus is configured to recognize, as a point, the center of an object along the scanning plane. On the other hand, the detection areas E11 to E38 are planes. Therefore, when the vehicle 2 is detected in a predetermined detection area, the center (point) of the vehicle 2 is present at all times within the predetermined detection area that is a plane. In addition, in general, the license plate 2a of the vehicle 2 is present near the center of the vehicle 2. Therefore, when an area that includes the detection area (any one of E31 to E38: refer to FIG. 2) in which the vehicle 2 is detected in the final-stage detection area group 9 is set as the imaging direction (with an angle of view) of the camera 4 as described above, an image of the license plate 2a can reliably be captured.

However, when imaging is performed at an angle of view in which any of the detection areas E31 to E38 just fits, a portion of the license plate 2a may not be captured in the image when the vehicle 2 is detected in the final-stage detection area group 9 in a position at the edge of the detection area E31 to E38 (for example, see FIG. 4). Therefore, when the vehicle 2 is detected in the detection areas E31 to E38 of the final-stage detection area group 9, the imaging control unit 3d controls the operation of the camera 4 so as to capture an image of the vehicle 2 at an angle of view that provides a predetermined angle margin to the area in which the vehicle 2 is detected. As a result, an image of the license plate 2a of the vehicle 2 can be captured with certainty, regardless of the position in which the vehicle 2 is detected in the final-stage detection area group 9.

The vehicle detecting unit 3c regularly references the position of the vehicle 2 acquired from the distance measurement data and all detection areas E11 to E38, thereby detecting the detection area among the plurality of detection areas E11 to E38 in which the vehicle 2 is present. As a result, the occurrence of the vehicle 2 being undetected can be prevented with certainty. The vehicle detecting unit 3c may dynamically change the area for detecting the vehicle 2. In other words, the vehicle detecting unit 3c may change the area for detection so that, when the entrance of the vehicle 2 onto the premises is detected by referencing the detection areas E11 and E12 of the first-stage detection area group 7, the vehicle 2 is subsequently detected by sequentially referencing the detection areas (E21 to E24 and E31 to E38) of the second- and subsequent-stage detection area groups 8 and 9. As a result, because the number of detection area groups to be referenced at the same time by the vehicle detecting unit 3c is a single detection area group, the processing load on the vehicle detecting unit 3c and the detection area setting unit 3b can be reduced.

Furthermore, in this case, when referencing the second- and subsequent-stage detection area groups 8 and 9, the vehicle detecting unit 3c may preferentially start referencing from a detection area of which the position in the width direction is near the detection area in which the vehicle 2 has been detected in the preceding-stage detection area group. For example, as shown in FIG. 3, when the vehicle 2 is detected in the detection area E11 of the first-stage detection area group 7, when referencing the second-stage detection area group 8, the vehicle detecting unit 3c first references the detection areas E21 and E22 of which the positions in the width direction are near the detection area E11, and subsequently references the detection areas E23 and E24 in this order. In addition, as shown in FIG. 3, when the vehicle 2 is detected in the detection area E22 of the second-stage detection area group 8, when referencing the third-stage detection area group 9, the vehicle detecting unit 3c first references the detection areas E33 and E34 of which the positions in the width direction are near the detection area E22, and subsequently references the detection areas E32, E35, E31, E36, E37, and E38 in this order.

As a result, the following effect can be achieved. In other words, the vehicle 2 that has entered the premises from the entrance G and is attempting to park rarely suddenly changes the movement direction. When the movement direction suddenly changes, it is highly likely that the vehicle 2 is making a U-turn immediately after entering from the entrance G and is exiting from the entrance G. Therefore, the position (detection area) in which the vehicle 2 passes through a predetermined-stage detection area group is very likely to be a position near the detection area in which the vehicle 2 has been detected in the preceding-stage detection area group. Therefore, in the above-described technique, detection of the vehicle 2 is performed by preferential referencing of the detection areas through which the vehicle 2 is most likely to pass. Thus, occurrence of the vehicle 2 being undetected, in which the vehicle 2 advances to the next-stage detection area group while a detection area in a position other than the position through which the vehicle 2 passes is being referenced, can be suppressed.

According to the present embodiment, the vehicle detecting unit 3c regularly detects (monitors) the entrance of a vehicle 2 onto the premises. The imaging control unit 3d starts the positioning operation of the camera 4 when the vehicle detecting unit 3c detects the entrance of the vehicle 2. Therefore, the camera 4 is not required to face the entrance G at all times. Thus, in the configuration according to the present embodiment, the camera 4 can perform other imaging operations, such as capturing a video for monitoring a predetermined area on the premises, during the period until the entrance of the vehicle 2 is detected. As a result, the camera 4 can be used to full capacity, thereby improving cost effectiveness.

Second Embodiment

A second embodiment of the present invention will hereinafter be described with reference to FIGS. 6 and 7.

According to the present embodiment, the area for detection of the vehicle 2 is dynamically changed in the following manner. In other words, when the vehicle 2 is detected in the first-stage detection area group 7, the vehicle detecting unit 3c detects the vehicle 2 by referencing the detection area, among the detection areas E21 to E24 of the second-stage detection area group 8, that corresponds to the position (detection area) in which the vehicle 2 is detected in the first-stage detection area group 7, as well as detection areas adjacent to the corresponding detection area. Then, the vehicle detecting unit 3c detects the vehicle 2 by referencing the detection area, among the detection areas E31 to E38 of the third-stage detection area group 9, that corresponds to the position in which the vehicle 2 is detected in the second-stage detection area group 8, as well as detection areas adjacent to the corresponding detection area.

Next, a specific example of the method for detecting the vehicle 2 according to the present embodiment will be described.

Figure 6:
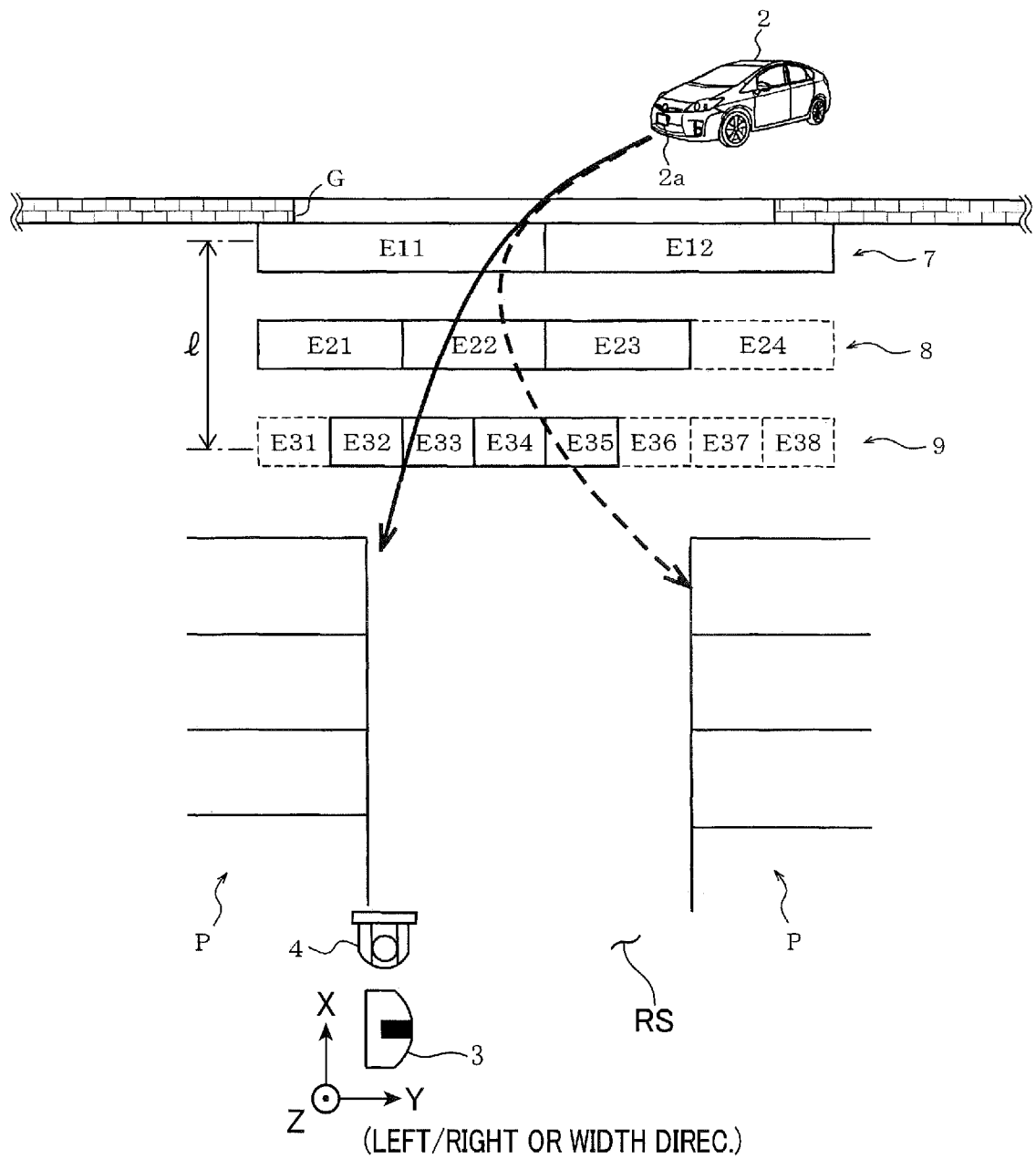
FIG. 6 is a diagram of a second embodiment, corresponding to FIG. 2.

As shown in FIG. 6, when the vehicle 2 is detected in the first-stage detection area E11, the vehicle detecting unit 3c performs detection of the vehicle 2 by setting, as detection targets, the detection areas E21 and E22 that correspond to the detection area E11 (are positioned below the detection area E11 in FIG. 6) and the detection area E23 that is adjacent to the detection area E22, among the detection areas E21 to E24 in the subsequent second stage. Therefore, the detection area E24 of the second-stage detection area group 8 is excluded from the detection targets.

Then, when the vehicle 2 is detected in the second-stage detection area E22, the vehicle detecting unit 3c performs detection of the vehicle 2 by setting, as the detection targets, the detection areas E33 and E34 that correspond to the detection area E22 (are positioned below the detection area E22 in FIG. 6) and the detection areas E32 and E35 that are respectively adjacent to the detection areas E33 and E34, among the detection areas E31 to E38 in the subsequent third stage. Therefore, the detection areas E31 and E36 to E38 in the third-stage detection area group 9 are excluded from the detection targets.

Figure 5:
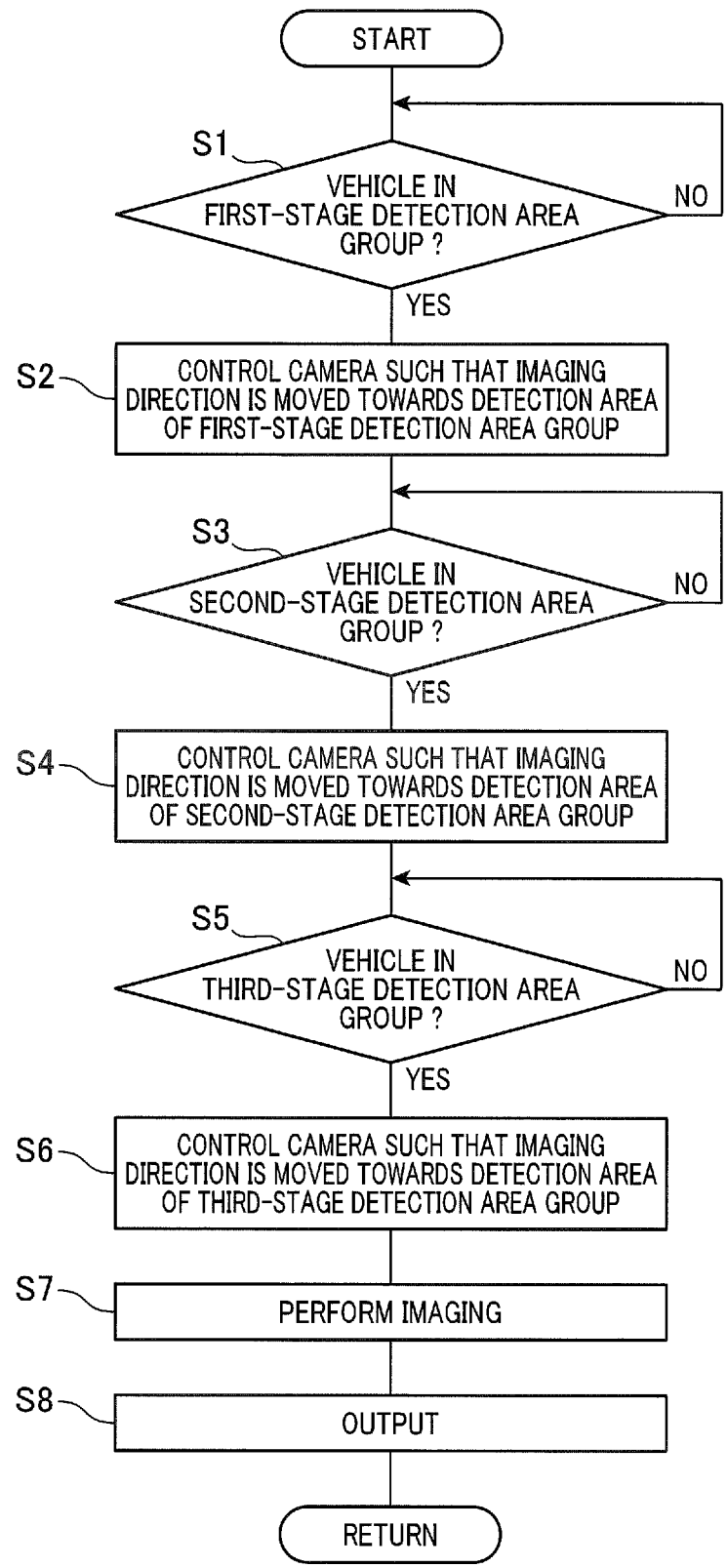
FIG. 5 is a flowchart outlining the positioning operation performed by an imaging control unit in the first embodiment.
Figure 7:
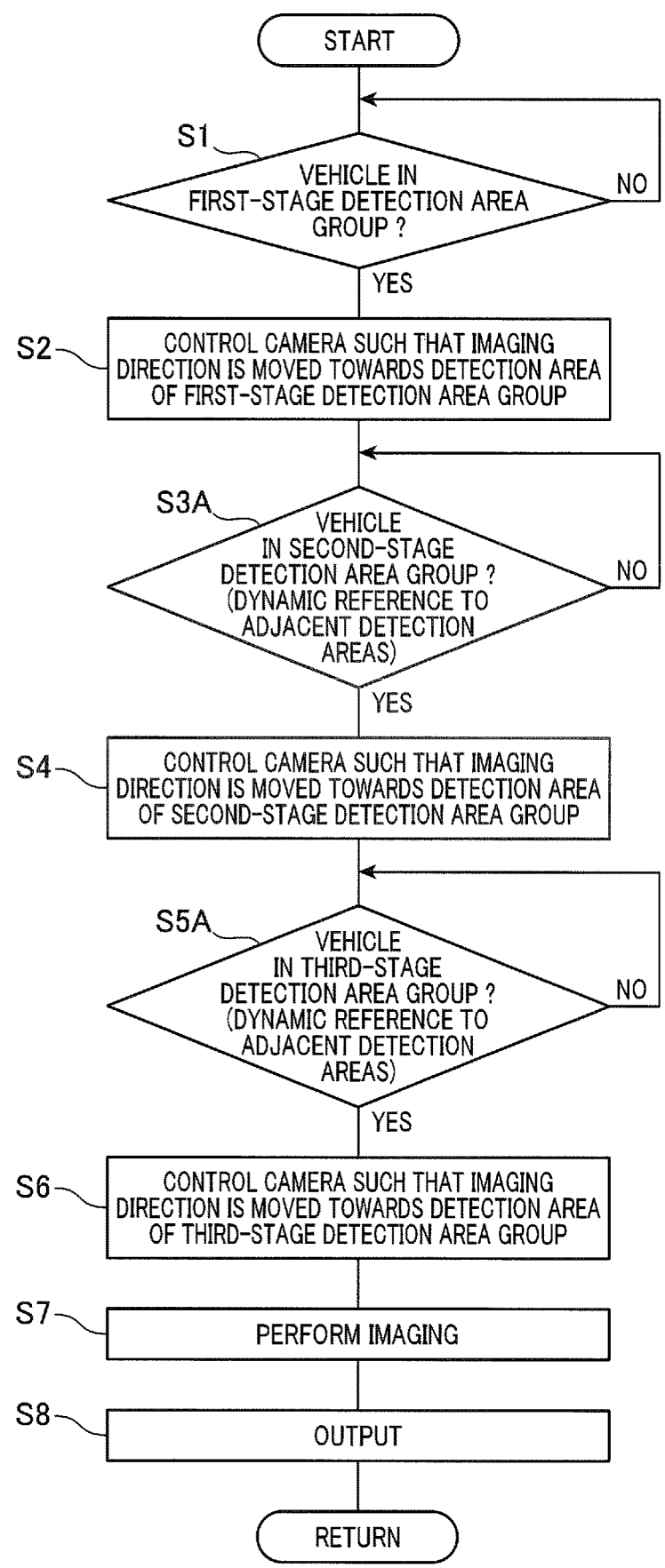
FIG. 7 is a flowchart outlining the positioning operation performed by an imaging control unit in the second embodiment.

The foregoing dynamic reference of adjacent detection areas in the next-stage detection area groups 8 and 9 are performed, together with the determination explained in step S3 and S5 in FIG. 5, in the determination steps S3A and S5A shown in FIG. 7, the other steps of which are the same as those in FIG. 5.

As a result, the number of detection areas to be referenced at the same time by the vehicle detecting unit 3c decreases as the distance from the entrance G increases. Furthermore, in this case, rather than the number of detection areas to be referenced simply being decreased, the number of detection areas to be referenced is decreased by excluding, from the reference targets, the detection areas to which the vehicle 2 is unlikely to move. Therefore, according to the present embodiment, the processing load on the vehicle detecting unit 3c and the detection area setting unit 3b can be further reduced, while suppressing the occurrence of the vehicle 2 being undetected.

In the above-described configuration, when the distance between the detection area groups 7 to 9 is too wide, or the lateral width of each detection area E11 to E38 is too narrow in relation to the estimated behavior of the vehicle 2, the occurrence of the vehicle 2 being undetected (untracked) can be suppressed with certainty by the number of detection areas set as reference targets in the second and third stages being increased.

Third Embodiment

Figure 8:
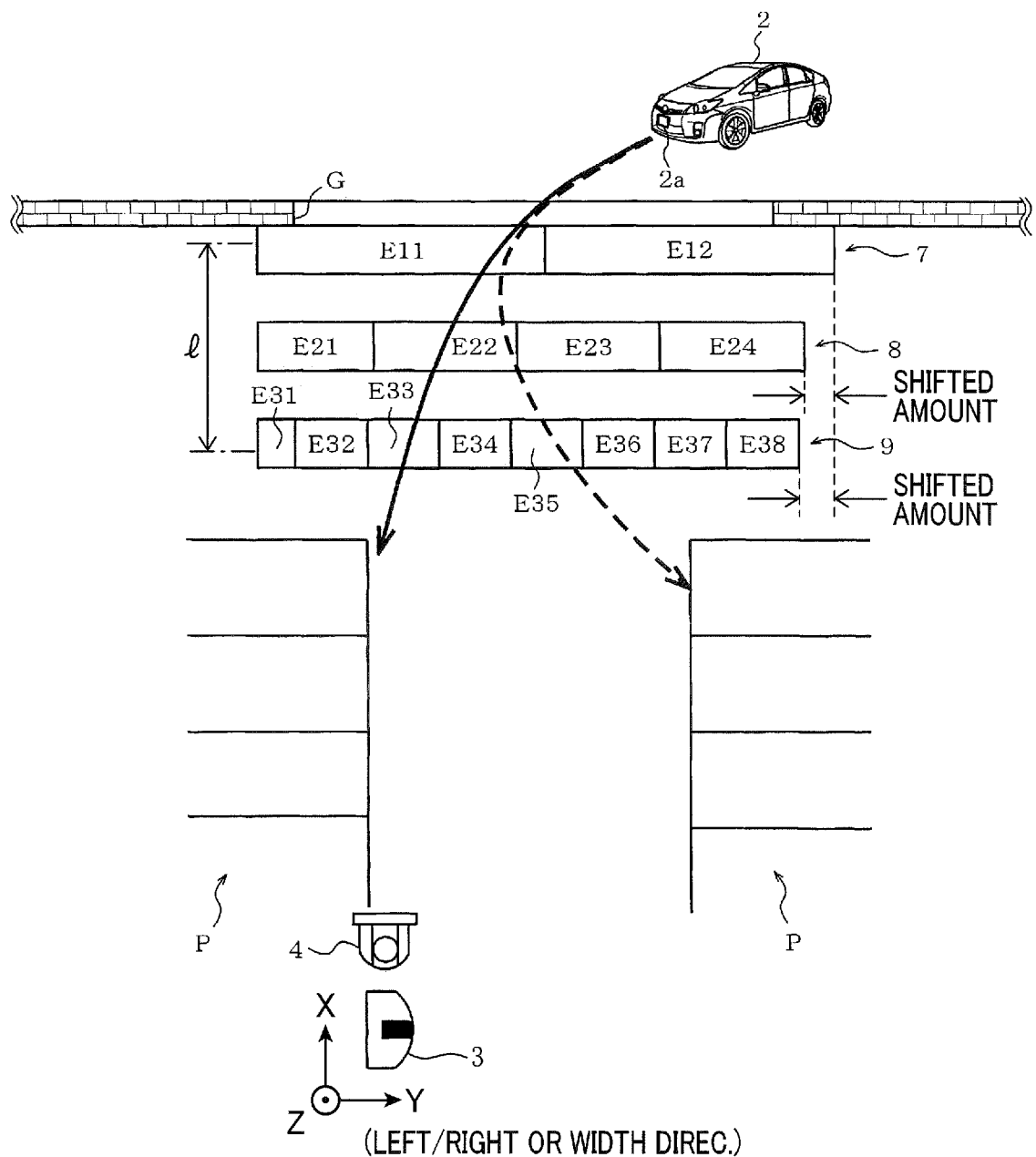
FIG. 8 is a diagram of a third embodiment, corresponding to FIG. 2.

A third embodiment of the present invention will hereinafter be described with reference to FIGS. 8 and 9.

The vehicle detecting unit 3c can detect the approximate position of the vehicle 2 in the detection areas E11 to E38 from the distance measurement data provided by the distance measuring unit 3a. The detection area setting unit 3b then adjusts the arrangement of the detection areas in the second- and subsequent-stage detection area groups 8 and 9 in the following manner, based on the approximate position of the vehicle 2 detected by the vehicle detecting unit 3c (arrangement adjustment process).

In other words, the detection area setting unit 3b estimates the subsequent movement trajectory of the vehicle 2 from the approximate position of the vehicle 2 in the detection area in which the vehicle 2 is detected in the preceding-stage detection area group. For example, as shown in FIG. 8, when the change in the approximate position of the vehicle 2 within the detection area E11 in which the vehicle 2 is detected in the first-stage detection area group 7 is as indicated by the solid line rather than the broken line, it can be estimated that the subsequent movement trajectory of the vehicle 2 will be that indicated by the solid line (step S11 in FIG. 9).

Figure 9:
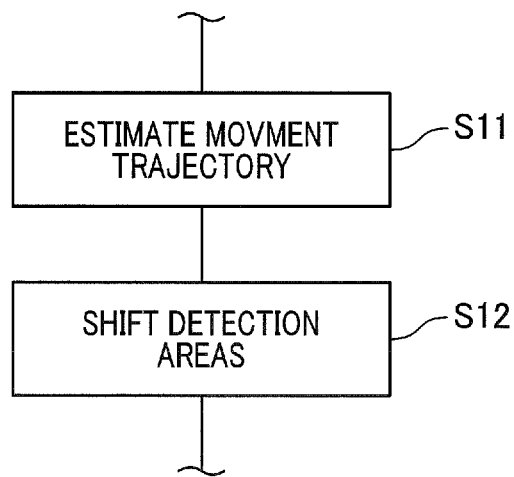
FIG. 9 is a partial flowchart outlining a shift adjustment of detection areas performed in the third embodiment.

The detection area setting unit 3b adjusts the arrangement in the width direction of the detection areas so that the vehicle 2 can be included in the width-direction center of the detection area (step S12 in FIG. 9). For example, as shown in FIG. 8, the detection area setting unit 3b adjusts (shifts to the left in FIG. 8) the arrangement in the width direction of the detection areas E21 to E24 and E31 to E38 of the second- and subsequent-stage detection area groups 8 and 9 so as to follow the movement trajectory of the vehicle 2. In this case, in the detection area groups 8 and 9, the detection areas E21 and E31 that are on the left end in FIG. 8 are cut so that the left edges thereof match the left edge of the detection area E11. However, the detection areas E21 and E31 may not be cut.

In this way, when the arrangement of the detection areas E21 to E24 and E31 to E38 in the second- and subsequent-stage detection area groups 8 and 9 is dynamically changed, the probability of the license plate 2a of the vehicle 2 ultimately being included in the center of the angle of view of the camera 4 is increased, while suppressing with certainty the occurrence of the vehicle 2 being undetected. Therefore, a captured image required for vehicle number recognition can be acquired with further certainty.

Other Embodiments

The present invention is not limited to the embodiments described above and shown in the drawings. The following modifications and expansions are possible.

The camera 4 is not required to be a PTZ camera and, for example, is merely required to be a camera that is at least capable of performing a pan operation, as long as the camera is to be used only to capture an image of the license plate 2a of the vehicle 2 that is entering from the entrance G. In addition, the camera itself is not required to be provided with a function for changing the imaging direction (orientation). For example, the function for changing the imaging direction may be actualized by the camera being attached to an attachment base that is capable of a rotating operation and of which the rotating operation is able to be controlled.

The camera 4 and the area sensor 3 can be installed on the same support, such as a pole.

In addition, the camera 4 is not required to include the still image imaging function 4c. In this case, the image processing apparatus 5 may be provided with a function for cutting out a still image from a video. Alternatively, the vehicle number recognition function 5a of the image processing apparatus 5 may be provided with a function for recognizing the vehicle number directly from the video. As a result, the image processing apparatus 5 can recognize the vehicle number of the vehicle 2 even when the camera 4 captures a video of the vehicle 2 that is entering the premises from the entrance G by the video imaging function 4b.

The function provided by the distance measuring unit 3a may be actualized not only by a laser radar that uses a laser, but also by other radar apparatuses that measure distance to an object, such as a radar apparatus that uses sound waves.

The detection area setting unit 3b is merely required to set the detection area groups in multiple stages from the entrance G towards the inside of the premises. Therefore, the detection area setting unit 3b may set the detection area groups in two stages, or four or more stages. For example, when the distance I determined by above-described expression (1) is short and it is difficult to set the detection area groups in three stages, the detection area groups may be set in two stages.

In addition, the number of detection areas composing the detection area group may be changed as appropriate, depending on the accuracy of detection of the vehicle 2 that is required and the like, as long as the following conditions are met: "the number of detection areas in the first-stage detection area group is two or more", and "the number of detection areas in the subsequent-stage detection area groups is larger than the number of detection areas in the preceding-stage detection area group". For example, a configuration is possible in which the final-stage detection area group is composed of four detection areas. However, in this case, the first-stage detection area group is composed of two detection areas, and the second-stage detection area group is omitted.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A system for recognizing a vehicle number of a license plate of a vehicle, the system comprising:
   an optical camera configured to point to a premises with an entrance, the optical camera being configured to change, in real space, an imaging direction thereof and capture an optical image including an image of the license plate of the vehicle entering the premises;

a distance measuring unit configured to intermittently emit a laser beam in each direction for scanning the premises so as to measure a distance to the vehicle which is present in the premises; and a processor configured to:
control the imaging direction of the optical camera;
virtually set in advance, in data, detection area groups each composed of a plurality of planar detection areas for detecting a position of the vehicle in the premises, the data positionally indicating the premises, the plurality of detection areas of each of the detection area groups being aligned in a width direction of the entrance and the plurality of detection areas of the detection area groups being aligned in multiple stages from the entrance towards inside the premises, and the detection area groups including:
a first-stage detection area group positionally closest to the entrance and composed of two or more of the detection areas; and
subsequent-stage detection area groups positionally subsequent from the first-stage detection area group, each subsequent-stage detection area group having a larger number of the detection areas than a preceding-stage detection area group;
detect (i) the vehicle entering the premises via the entrance, and (ii) the position of the vehicle, based on both the plurality of detection areas and the measured distance;
perform a first determination of whether the vehicle has been detected in the detection areas of the first-stage detection area group;
perform a first change of the imaging direction of the optical camera towards a position of the first-stage detection area group upon determining in the first determination that the vehicle has been detected in the detection areas of the first-stage detection area group;
perform a second determination of whether the vehicle has been detected in the detection areas of a next-stage, but not a final-stage, detection area group among the detection area groups;
perform a second change of the imaging direction of the optical camera towards a position of the next-stage detection area group upon determining in the second determination that the vehicle has been detected in the detection areas of the next-stage, but not the final-stage, detection area group;
repeatedly perform the second determination and second change until determining in the second determination that the vehicle has been detected in a detection area of the final-stage detection area group; and
control the optical camera to capture the image of the license plate of the vehicle in the imaging direction of the optical camera changed in the second change in the final-stage detection area group, at an angle of view that provides a predetermined angle margin to the detection area of the final stage detection area group, upon determining in the second determination that the vehicle has been detected in the detection area of the final-stage detection area group, the predetermined angle margin being set to be larger than half of a lateral size of the license plate in the width direction.

2. The system of claim 1, wherein the processor is further configured to:

perform a first detection of the vehicle entering the premises by referring to the first-stage detection area group; and
perform a second detection of the vehicle by sequentially referring to the subsequent-stage detection area groups.

3. The system of claim 2, wherein the processor is further configured to, in the second detection, preferentially refer to a selected detection area of a currently determined detection area group among the subsequent-stage detection area groups, the selected detection area being positionally closer in the width direction to a specific detection area of a preceding-stage detection area group among the subsequent-stage detection area groups, the vehicle being detected in a last determination at the specific detection area of the preceding-stage detection area group.

4. The system of claim 2, wherein the processor is configured to, in the second detection, refer to a selected detection area of a currently determined detection area group among the subsequent-stage detection area groups, the selected detection area being positionally same as and adjacent to, in the width direction, a specific detection area of a preceding-stage detection area group among the subsequent-stage detection area groups, the vehicle being detected in a last determination at the specific detection area of the preceding-stage detection area group.

5. The system of claim 2, wherein the processor is further configured to:
detect an approximate position in the detection areas in both the first detection and the second detection;
adjust arrangement of the detection areas of the respective subsequent-stage detection area groups positionally subsequent to the first-stage detection area group;
estimate a movement trajectory of the vehicle from the approximate position detected in a preceding-stage detection area group; and
readjust the arrangement of the detection areas in the width direction such that the movement trajectory passes through a center of each of the detection areas in the width direction.

6. The system of claim 5, wherein the processor is further configured to:
detect, as the position of the vehicle, a center of the vehicle in a horizontal direction; and
control the optical camera to capture, as the image of the vehicle, a still image of the vehicle in the imaging direction changed in the second change in the final-stage detection area group.

7. The system of claim 1, wherein the processor is further configured to:
detect, as the position of the vehicle, a center of the vehicle in a horizontal direction; and
control the optical camera to capture a still image of the vehicle in the imaging direction changed in the second change and at the angle of view that provides the predetermined angle margin to the detection area of the final-stage detection area group.

8. The system of claim 1, wherein:
the optical camera is configured to output the captured image, and
the system further comprises an image processor configured to recognize the vehicle number of the vehicle from the image of the license plate of the vehicle which is outputted by the optical camera.

9. The system of claim 8, wherein the processor is further configured to:

perform a first detection of the vehicle entering the premises by referring to the first-stage detection area group; and perform a second detection of the vehicle by sequentially referring to the subsequent-stage detection area groups.

10. The system of claim 9, wherein the processor is further configured to, in the second detection, preferentially refer to a selected detection area of a currently determined detection area group among the subsequent-stage detection area groups, the selected detection area being positionally closer in the width direction to a specific detection area of a preceding-stage detection area group among the subsequent-stage detection area groups, the vehicle being detected in a last determination at the specific detection area of the preceding-stage detection area group.

11. The system of claim 9, wherein the processor is further configured to, in the second detection, refer to a selected detection area of a currently determined detection area group among the subsequent-stage detection area groups, the selected detection area being positionally same and adjacent, in the width direction, as and to a specific detection area of a preceding-stage detection area group among the subsequent-stage detection area groups, the vehicle being detected in a last determination at the specific detection area of the preceding-stage detection area group.

12. A system for imaging a license plate of a vehicle, the system comprising:
an optical camera configured to be directed towards a premises provided with an entrance, the camera being configured to change, in real space, at least an imaging direction of the camera, the camera being configured to capture an optical image of the vehicle;
a distance measuring unit configured to intermittently emit a laser beam in each scanning direction of a plurality of scanning directions directed to the premises so as to measure a distance to the vehicle which is present in the premises; and
a processor configured to:
virtually set in advance, in data stored in a memory, a plurality of detection area groups, each detection area group of the plurality of detection area groups being composed of a plurality of planar detection areas, the data virtually indicating the premises in the memory, the plurality of planar detection areas of each detection area group of the plurality of detection area groups being aligned in a width direction of the entrance, the plurality of detection area groups being aligned in multiple stages from the entrance in a direction directed towards an interior of the premises and having a same size in the width direction, the plurality of planar detection areas increasing in number in each stage of the multiple stages in the direction directed towards the interior of the premises;
detect i) the vehicle entering the premises via the entrance, and ii) a position of the vehicle in the plurality of detection area groups in the premises, based on information indicating coordinate positions of the plurality of planar detection areas and the measured distance in each scanning direction of the plurality of scanning directions, the detected position of the vehicle being determined to be one of the planar detection areas of each detection area group of the plurality of detection area groups;
estimate a movement trajectory of the vehicle in the premises based on the coordinate position of the plurality of detection area groups and the position of the vehicle in the premises;
start control of the imaging direction of the camera upon detection of the vehicle entering the premises via the entrance;
control the imaging direction of the camera so as to track the detected position of the vehicle in the premises based on the estimated movement trajectory, the controlling of the imaging direction of the camera being performed in response to every instance the vehicle is detected in each detection area group of the plurality of detection area groups; and
upon completing the control of the imaging direction of the camera in a last detection area group of the plurality of detection area groups, control the camera to capture the image of the license plate of the vehicle in the changed imaging direction of the camera.

13. The system of claim 12, wherein:
the processor is configured to virtually set the plurality of detection area groups between the entrance and a plurality of parking spaces in the premises, the vehicle being parked at each of the plurality of parking spaces, and
adjacent detection area groups of the plurality of detection area groups are separated from each other in the direction directed toward the interior of the premises.

14. The system of claim 13, wherein the detection area groups include a first-stage detection area group located positionally closest to the entrance in the direction directed towards the interior of the premises, and subsequent-stage detection area groups located positionally subsequent from the first-stage detection area group, the first-stage detection area group being composed of two or more of the planar detection areas, the subsequent-stage detection area groups being composed of one or more detection area groups.

15. The system of claim 14, wherein the processor is further configured to:
determine whether the vehicle has been detected in the plurality of planar detection areas of the first-stage detection area group,
change the imaging direction of the camera towards a position of the first-stage detection area group virtually set in the premises when the vehicle has been detected in the plurality of planar detection areas of the first-stage detection area group,
determine whether the vehicle has been detected in the plurality of planar detection areas of a next-stage, but non-last-stage, detection area group among the detection area groups,
change the imaging direction of the camera towards a position of the next-stage detection area group virtually set in the premises upon determining that the vehicle has been detected in the plurality of planar detection areas of the next-stage, but non-final-stage, detection area group,
repeatedly determine whether the vehicle has been detected in the plurality of planar detection areas of a next-stage and change the imaging direction of the camera towards a position of the next-stage detection area group virtually set in the premises upon determining that the vehicle has been detected in the detection areas of the final-stage detection area group, and
control the camera to capture the image of the license plate of the vehicle in the changed imaging direction of the camera upon determining that the vehicle has been detected in the plurality of planar detection areas of the final-stage detection area group.

16. The system of claim 15, wherein the processor is configured to detect the vehicle entering the premises by referring to the first-stage detection area group, and detect the vehicle by sequentially referring to the subsequent-stage detection area groups.

17. The system of claim 16, wherein the processor is configured to preferentially refer to a selected detection area of a currently determined detection area group among the subsequent-stage detection area groups, the selected planar detection area being located positionally closer in the width direction to a specific planar detection area of a preceding-stage detection area group among the subsequent-stage detection area groups, the vehicle being detected in the last determination at the specific planar detection area of the preceding-stage detection area group.

\* \* \* \* \*